(12) United States Patent
Carpenter et al.

(10) Patent No.: US 12,070,889 B2
(45) Date of Patent: Aug. 27, 2024

(54) SYSTEM FOR SIMULTANEOUSLY FORMING AND FILLING A POLYMERIC CONTAINER

(71) Applicant: LIQUIFORM GROUP LLC, Saline, MI (US)

(72) Inventors: Gregory Carpenter, Ann Arbor, MI (US); Gregory Hall, Adrian, MI (US); Richard Steih, Jackson, MI (US); Steven Charles Dettling, Manchester, MI (US); Theodore Tekip, Royal Oak, MI (US)

(73) Assignee: LiquiForm Group LLC, Saline, MI (US)

( * ) Notice: Subject to any disclaimer, the term of this patent is extended or adjusted under 35 U.S.C. 154(b) by 66 days.

(21) Appl. No.: 18/011,808

(22) PCT Filed: Jun. 22, 2020

(86) PCT No.: PCT/US2020/038880
§ 371 (c)(1),
(2) Date: Dec. 20, 2022

(87) PCT Pub. No.: WO2021/262133
PCT Pub. Date: Dec. 30, 2021

(65) Prior Publication Data
US 2023/0234275 A1    Jul. 27, 2023

(51) Int. Cl.
*B65B 3/02* (2006.01)
*B29C 49/46* (2006.01)
(Continued)

(52) U.S. Cl.
CPC .............. *B29C 49/46* (2013.01); *B29C 49/48* (2013.01); *B65B 3/022* (2013.01); *B65B 3/04* (2013.01);
(Continued)

(58) Field of Classification Search
CPC .. B65B 3/022; B65B 3/10; B65B 3/26; B65B 3/30; B65B 31/025; B29C 2949/0715;
(Continued)

(56) References Cited

U.S. PATENT DOCUMENTS

2010/0300043 A1* 12/2010 Thomasset ............... B65B 3/022
 53/425
2012/0266565 A1* 10/2012 Trude ................... B65D 23/102
 264/537
(Continued)

FOREIGN PATENT DOCUMENTS

WO    2017/038584 A1    3/2017

*Primary Examiner* — Jacob A Smith
(74) *Attorney, Agent, or Firm* — Honigman LLP; Eric J. Sosenko; Jonathan P. O'Brien

(57) ABSTRACT

A system for simultaneously forming and filling a polymeric container with a product. The system includes a mold defining a container profile and a mold vacuum vent extending from the container profile to an upper surface of the mold. A striker plate is secured to the upper surface of the mold. The striker plate defines a striker vacuum vent that aligns with the mold vacuum vent to allow some of the product to be pulled by vacuum out of the mold through the mold vacuum vent and the striker vacuum vent.

20 Claims, 4 Drawing Sheets

(51) Int. Cl.
*B29C 49/48* (2006.01)
*B65B 3/04* (2006.01)
*B29C 49/62* (2006.01)
*B29L 31/00* (2006.01)

(52) U.S. Cl.
CPC ............. *B29C 2049/4664* (2013.01); *B29C 2049/6272* (2022.05); *B29L 2031/712* (2013.01)

(58) Field of Classification Search
CPC ............. B29C 49/06; B29C 2049/465; B29C 2049/4664
USPC .......................................................... 53/453
See application file for complete search history.

(56) References Cited

U.S. PATENT DOCUMENTS

2015/0284115 A1    10/2015  Voth et al.
2016/0023785 A1*   1/2016   Clüsserath ............. B29C 49/78
                                                  425/145
2016/0207242 A1*   7/2016   Ferrari ................ B29C 49/0005

* cited by examiner

SYSTEM FOR SIMULTANEOUSLY FORMING AND FILLING A POLYMERIC CONTAINER

FIELD

The present disclosure relates to a system for simultaneously forming and filling a polymeric container.

BACKGROUND

This section provides background information related to the present disclosure, which is not necessarily prior art.

Current systems for simultaneously forming and filling a container are suitable for their intended use, but subject to improvement. For example, current systems may exhibit issues with under-formed shoulders and container scarring. Liquid from ruptures may fill vents in the container mold, and scar subsequent containers. Current practice of sealing the vents between the striker plate and the mold shoulder with a silicone seal to prevent liquid build-up is subject to improvement. The present disclosure overcomes these issues and provides numerous advantages, as explained in detail herein and as one skilled in the art will appreciate.

SUMMARY

This section provides a general summary of the disclosure, and is not a comprehensive disclosure of its full scope or all of its features.

The present disclosure provides for a system for simultaneously forming and filling a polymeric container with a product. The system includes a mold defining a container profile and a mold vacuum vent extending from the container profile to an upper surface of the mold. A striker plate is secured to the upper surface of the mold. The striker plate defines a striker vacuum vent that aligns with the mold vacuum vent to allow some of the product to be pulled by vacuum out of the mold through the mold vacuum vent and the striker vacuum vent.

The present disclosure further provides for a method for simultaneously forming and filling a polymeric container. The method includes injecting a product into a preform seated in a mold to simultaneously form the container from the preform and fill the container with the product. The method further includes generating a vacuum to draw excess product out of the mold through a mold vacuum vent defined by the mold and a striker vacuum vent of a striker plate attached the mold.

The present disclosure also provides for a system for simultaneously forming and filling a polymeric container with a product. The system includes a mold defining a container profile and a mold vacuum vent extending from the container profile to an upper surface of the mold. A striker plate is secured to the upper surface of the mold. The striker plate defines a striker vacuum vent that aligns with the mold vacuum vent to allow some of the product to be pulled by vacuum out of the mold through the mold vacuum vent and the striker vacuum vent. A vacuum generator is configured to generate the vacuum that pulls some of the product out of the mold through the mold vacuum vent and the striker vacuum vent. A knock-out vessel is configured to regulate the vacuum and receive the product pulled by the vacuum out of the mold. A vacuum valve is between the striker plate and the knock-out vessel. The vacuum valve is configured to sync the vacuum with consecutive container forming and filling processes.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
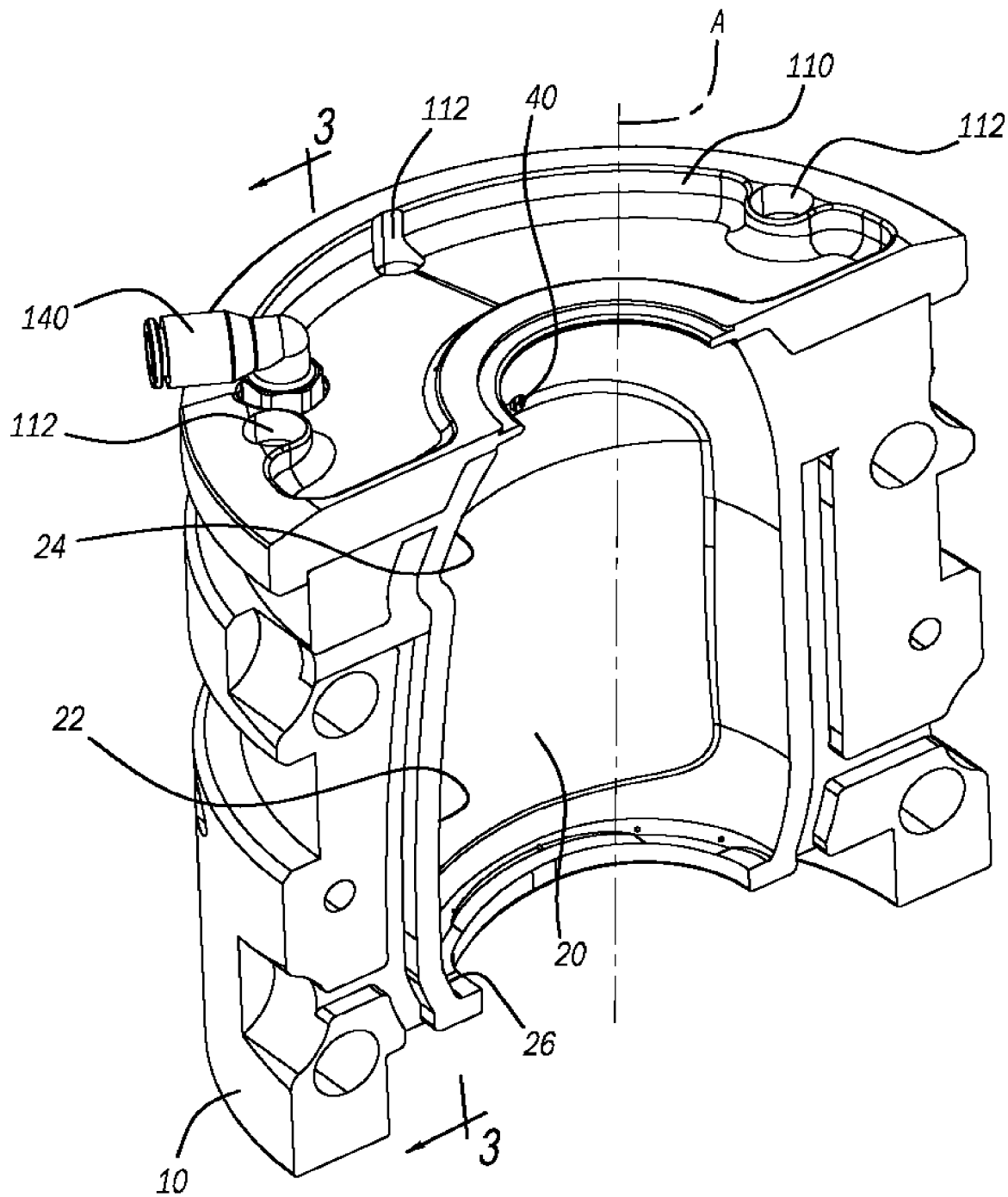
FIG. 1 illustrates one half of a mold and striker plate in accordance with the present disclosure for simultaneously forming and filling a polymeric container.
Figure 2:
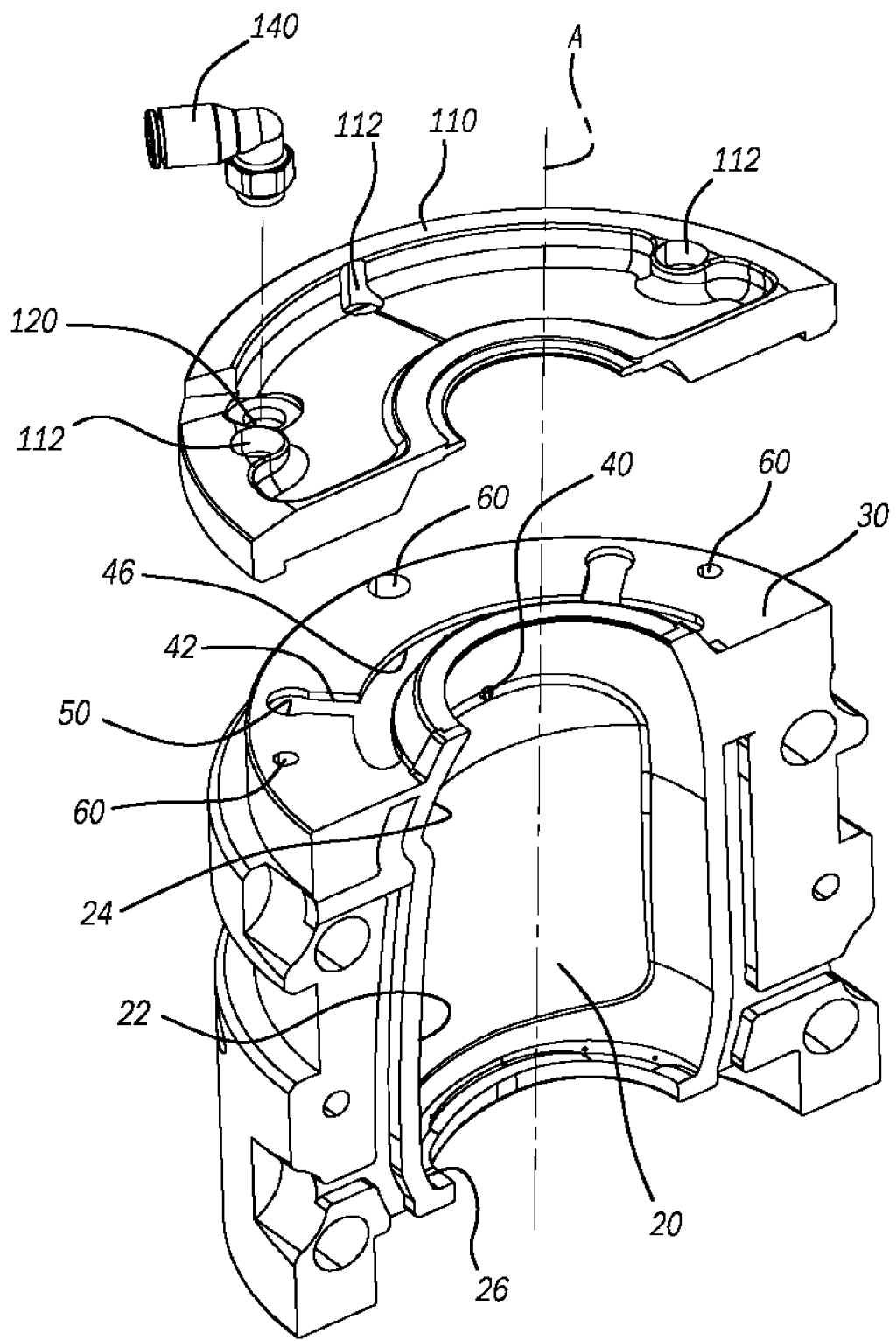
FIG. 2 is an exploded view of FIG. 1.
Figure 3:
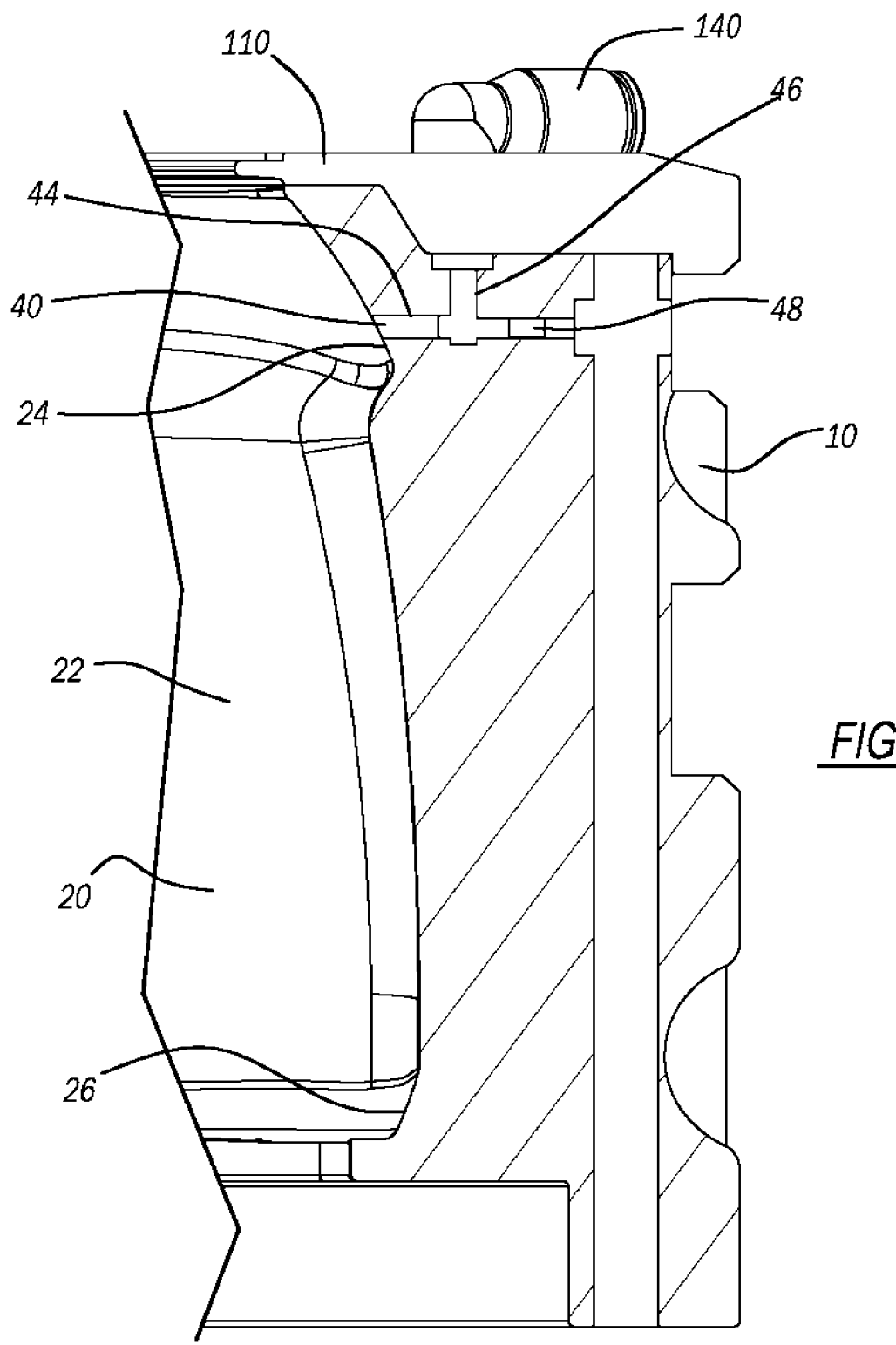
FIG. 3 is a cross-sectional view taken along line 3-3 of FIG. 1.

FIGS. 1, 2, and 3 illustrate a mold 10 and a striker plate 110 in accordance with the present disclosure for receiving product from any suitable forming and filling head for simultaneously forming and filling a polymeric container from a container preform seated within the mold 10. The preform and the resulting container can be formed of any suitable polymeric material, such as polyethylene terephthalate (PET), low-density polyethylene (LDPE), high-density polyethylene (HDPE), polypropylene (PP), polystyrene, and the like, for example. The forming and filling head, mold 10, and striker plate 110 are configured for use with any suitable Liquiform® machine, for example, such as described in the following United States Patents, each of which is incorporated herein by reference: U.S. Pat. Nos. 7,914,726; 8,017,064; 8,435,026; and U.S. Pat. No. 8,573,964. Any suitable product may be injected from the head into the preform to simultaneously form the container from the preform and fill the container with the product. Suitable products include, but are not limited to, water, sports drinks, juice, sauces, any suitable foodstuffs, etc.

The mold 10 illustrated in FIGS. 1-3 is one-half of a mold in accordance with the present disclosure. The other half, which is not illustrated, is substantially similar to, or identical to, the half of the mold 10 that is illustrated. Likewise, the striker plate 110 illustrated in FIGS. 1-3 is one-half of a striker plate in accordance with the present disclosure. The other half, which is not illustrated, is substantially similar to, or identical to, the half of the striker plate 110 that is illustrated. The description of the illustrated halves of the mold 10 and striker plate 110 set forth herein also applies to the halves that are not illustrated.

The mold 10 defines a container profile 20 into which the preform is blown. The container profile 20 may have any suitable shape and dimensions corresponding to the desired container to be formed and filled. In the example illustrated, the container profile 20 includes a body region 22, a shoulder region 24, and a heel region 26. The mold 10 further includes an upper surface 30. The striker plate 110 is coupled to the mold 10 at the upper surface 30, as described further herein.

The mold 10 further defines a mold vacuum vent extending from the container profile 20 to the upper surface 30. The mold vacuum vent includes an inlet 40 defined by the mold 10 at the container profile 20. In the example illustrated, the vent inlet 40 is at, or proximate to, the shoulder region 24. The vent inlet 40 may alternatively be arranged at any other suitable location of the container profile 20. From the vent inlet 40, the mold vacuum vent extends through the mold 10 to a vent outlet 42 at the upper surface 30. With particular reference to FIG. 3, a first portion 44 of the mold vacuum vent extends from the vent inlet 40 in a direction perpendicular to, or generally perpendicular to, a mid-line A of both the mold 10 and the container profile 20. Extending from the first portion 44 is a second portion 46 of the mold vacuum vent. The second portion 46 extends perpendicular to, or generally perpendicular to, the first portion 44. The second portion 46 connects to the first portion 44 at an area between the vent inlet 40 and a plug 48. The plug 48 may be an aluminum expansion plug, which blocks the first portion 44 downstream of the second portion 46, and thus excess product flowing through the first portion 44 flows to the second portion 46.

With particular reference to FIG. 2, the second portion 46 of the mold vacuum vent is generally semicircular. Extending from the semicircular second portion 46 is a wing portion 50 of the vent outlet 42. Excess product pulled from the container profile 20 is pulled into the mold vacuum vent through the vent inlet 40, and drawn out of the mold vacuum vent through the vent outlet 42 at the wing portion 50.

At the upper surface 30 are receptacles 60 defined within the mold 10. The receptacles 60 are configured to receive any suitable fasteners for securing the striker plate 110 to the upper surface 30 of the mold 10. The striker plate 110 defines a plurality of apertures 112, each of which is positioned to align with one of the receptacles 60 when the striker plate 110 is seated on the upper surface 30. The striker plate 110 is secured to the mold 10 by fasteners inserted though each one of the apertures 112 into the receptacles 60.

The striker plate 110 further defines a striker vacuum vent 120, which extends through the striker plate 110. The striker vacuum vent 120 is arranged to align with the wing portion 50 of the vent outlet 42 when the striker plate 110 is coupled to the mold 10. A nozzle 140 may be connected to the striker vacuum vent 12 on an outer surface of the striker plate 110. The nozzle 140 may be configured to swivel to facilitate connection of the nozzle 140 to a vacuum line. Thus, excess product drawn out of the mold 10 through the mold vacuum vent by vacuum flows through the first and second portions 44, 46 of the mold vacuum vent, through the striker vacuum vent 120, and through the nozzle 140.

Figure 4:
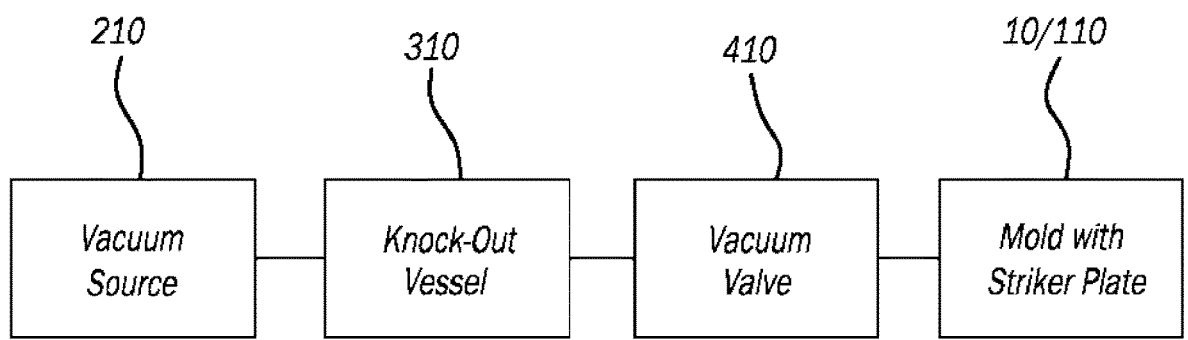
FIG. 4 illustrates a system for simultaneously forming and filling a polymeric container in accordance with the present disclosure.

With reference to FIG. 4, the vacuum source for generating the vacuum is illustrated at reference numeral 210. The vacuum source 210 may include a vacuum pump, or any other device suitable for generating a vacuum sufficient to draw excess product out of the mold 10. Between the vacuum source 210 and the striker plate 110 is a knock-out vessel 310. The knock-out vessel 310 is configured to regulate the vacuum generated by the vacuum source 210 and receive the excess product pulled out of the mold 10. Connected to a vacuum line extending from the nozzle 140 and a vacuum line extending from the knock-out vessel 310 is a vacuum valve 410. The vacuum valve 410 is configured to sync the vacuum generated by the vacuum source 210 with forming and filling processes for consecutive containers. The vacuum valve 410 regulates the vacuum generated by the vacuum source 210, which is particularly advantageous in applications where the vacuum source 210 is constantly drawing vacuum on the knock-out vessel 310.

The present disclosure thus provides numerous advantages. For example, the vacuum generated by the vacuum source 210 draws excess product out of the mold 10 through the mold vacuum vent 40, 42, 44, 46, 50, the striker vacuum vent 120, and the nozzle 140 to eliminate accumulation of liquid product between the mold 10 and the striker plate 110. Removing excess product in this manner also advantageously facilitates formation of the shoulder region of the container, and prevents container scarring. One skilled in the art will appreciate that the present disclosure provides numerous additional advantages and unexpected results as well.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A system for simultaneously forming and filling a polymeric container with a product, the system comprising:
   a mold defining a container profile and a mold vacuum vent extending from the container profile to an upper surface of the mold; and
   a striker plate secured to the upper surface of the mold, the striker plate defining a striker vacuum vent that aligns with the mold vacuum vent to allow some of the product to be pulled by vacuum out of the mold through the mold vacuum vent and the striker vacuum vent.

2. The system of claim 1, wherein the container profile includes a body region, a shoulder region, and a heel region.

3. The system of claim 1, wherein the mold vacuum vent includes an inlet at the container profile and an outlet at the upper surface of the mold.

4. The system of claim 3, wherein the inlet is at a shoulder region of the container profile.

5. The system of claim 3, wherein the mold vacuum vent includes a first portion extending from the inlet into the mold, and a second portion extending from the first portion to the outlet at the upper surface of the mold.

6. The system of claim 5, wherein the first portion extends perpendicular to the second portion.

7. The system of claim 5, wherein the second portion has a semi-circular shape.

8. The system of claim 1, further comprising a nozzle extending from the striker vacuum vent, wherein the nozzle is configured to swivel.

9. The system of claim 1, further comprising a vacuum generator configured to generate the vacuum for pulling some of the product out of the mold through the mold vacuum vent and the striker vacuum vent.

10. A method for simultaneously forming and filling a polymeric container, the method comprising:
    injecting a product into a preform seated in a mold to simultaneously form the container from the preform and fill the container with the product; and
    generating a vacuum to draw excess product out of the mold through a mold vacuum vent defined by the mold and a striker vacuum vent of a striker plate attached the mold.

11. The method of claim 10, wherein the mold vacuum vent includes an inlet at a container profile of the mold and an outlet at an upper surface of the mold to which the striker plate is attached.

12. The method of claim 11, wherein the inlet is at a shoulder region of the container profile.

13. The method of claim 11, wherein the mold vacuum vent includes a first portion extending from the inlet into the mold, and a second portion extending from the first portion to the outlet at the upper surface of the mold, the first portion extends perpendicular to the second portion.

14. The method of claim 10, further comprising connecting a nozzle of the striker plate to a vacuum generator.

15. A system for simultaneously forming and filling a polymeric container with a product, the system comprising:
    a mold defining a container profile and a mold vacuum vent extending from the container profile to an upper surface of the mold;
    a striker plate secured to the upper surface of the mold, the striker plate defining a striker vacuum vent that aligns with the mold vacuum vent to allow some of the product to be pulled by vacuum out of the mold through the mold vacuum vent and the striker vacuum vent;
    a vacuum generator configured to generate the vacuum that pulls some of the product out of the mold through the mold vacuum vent and the striker vacuum vent;
    a knock-out vessel configured to regulate the vacuum and receive the product pulled by the vacuum out of the mold; and
    a vacuum valve between the striker plate and the knock-out vessel, the vacuum valve configured to sync the vacuum with consecutive container forming and filling processes.

16. The system of claim 15, wherein the container profile includes a body region, a shoulder region, and a heel region.

17. The system of claim 16, wherein the mold vacuum vent includes an inlet at the shoulder region and an outlet at the upper surface of the mold.

18. The system of claim 15, wherein the mold vacuum vent includes a first portion extending from the inlet into the mold, and a second portion extending from the first portion to the outlet at the upper surface of the mold.

19. The system of claim 18, wherein the first portion extends perpendicular to the second portion.

20. The system of claim 15, further comprising a nozzle extending from the striker vacuum vent, wherein the nozzle is configured to swivel.

* * * * *